United States Patent [19]
Delmas

[11] Patent Number: 5,343,303
[45] Date of Patent: Aug. 30, 1994

[54] DEVICE FOR ASSISTANCE IN THE OPTICAL FOCUSING OF A TELEVISION CAMERA, AND CAMERA PROVIDED WITH SUCH A DEVICE

[75] Inventor: Francis Delmas, Herblay, France

[73] Assignee: Thomson Broadcast, Cergy St Christophe, France

[21] Appl. No.: 758,583

[22] Filed: Sep. 12, 1991

[30] Foreign Application Priority Data

Sep. 19, 1990 [FR] France ................... 90 11553

[51] Int. Cl.$^5$ ........................................ H04N 5/232
[52] U.S. Cl. ........................ 348/346; 354/409; 348/334
[58] Field of Search ............ 358/227, 224, 221, 209, 358/168, 170, 171; 354/409, 400; H04N 5/232

[56] References Cited

U.S. PATENT DOCUMENTS

| | | | |
|---|---|---|---|
| 4,463,384 | 7/1984 | Fujikawa et al. | 358/227 |
| 4,566,036 | 1/1986 | Kadosawa | 358/210 |
| 4,614,975 | 9/1986 | Kaite | 358/227 |
| 4,794,459 | 12/1988 | Moberg et al. | 358/227 |
| 4,975,547 | 12/1990 | Nakayama et al. | 200/5 R |
| 5,003,400 | 3/1991 | Murakami et al. | 358/227 |

OTHER PUBLICATIONS

Japan Abstract, vol. 14, No. 425 (E-977) (4368), Sep. 13, 1990, & JP-A-2-162973, Jun. 22, 1990, R. Kuga, "Video Camera Equipment".

Japan Abstract, vol. 7, No. 27 (E-156) (1172), Feb. 3, 1983, & JP-A-57-183186, Nov. 11, 1982, Katsuji Ishikawa, "Focusing Point Detector".

Primary Examiner—Michael T. Razavi
Assistant Examiner—Tuan V. Ho
Attorney, Agent, or Firm—Oblon, Spivak, McClelland, Maier & Neustadt

[57] ABSTRACT

A device for assistance in the optical focusing of the objective of a camera comprises a contour extraction circuit coupled to a marker generator, the output of which is connected to a combination circuit furthermore receiving the video signal from the camera. The resultant composite signal is applied to the viewfinder. Thus a marker, the position of which in the image is a function of the focusing, appears in the viewfinder, the focusing being obtained when the marker is in an extreme position on its axis of shift. The device can be applied notably to the focusing of high-definition television cameras.

6 Claims, 1 Drawing Sheet

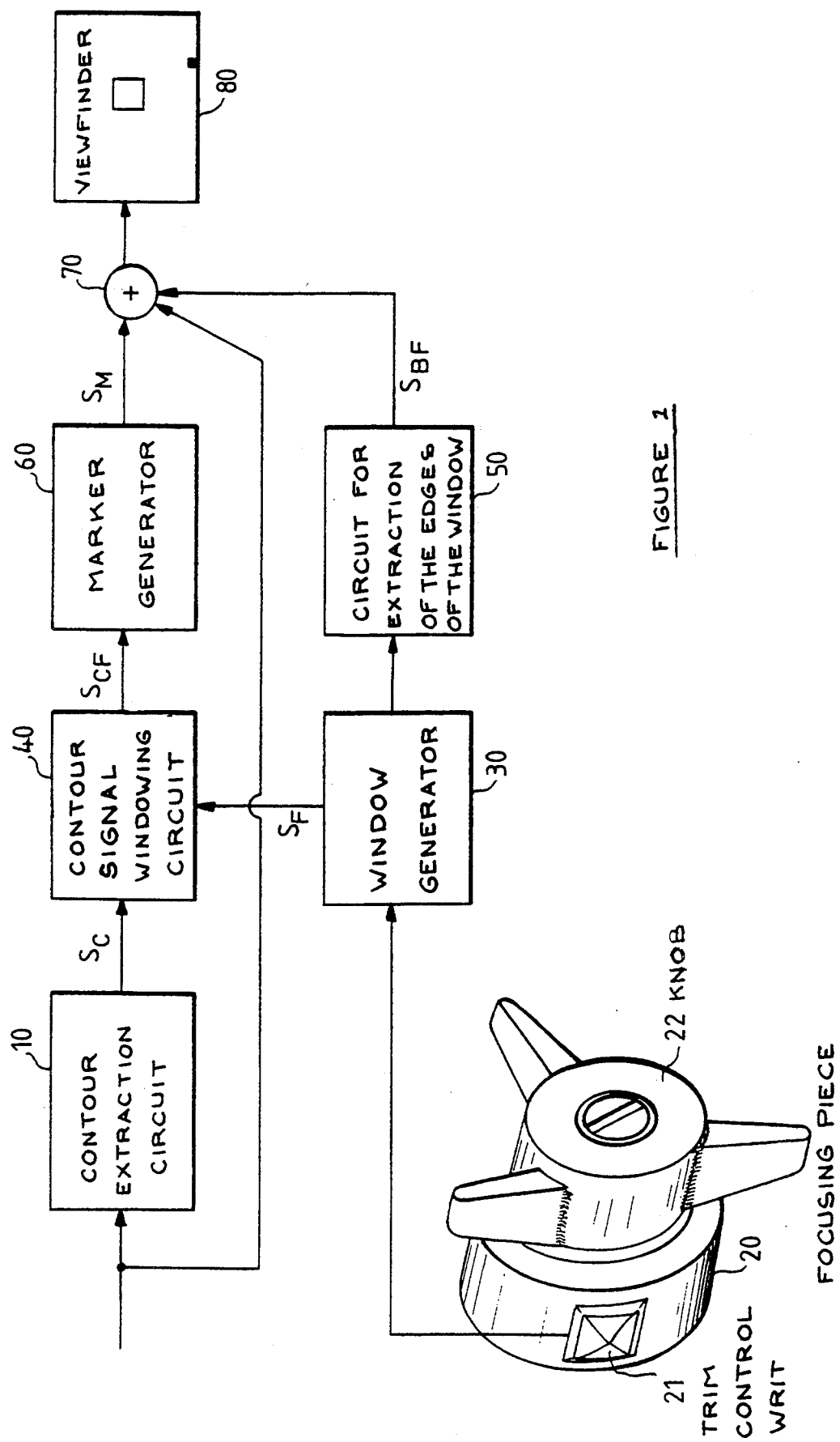

DEVICE FOR ASSISTANCE IN THE OPTICAL FOCUSING OF A TELEVISION CAMERA, AND CAMERA PROVIDED WITH SUCH A DEVICE

BACKGROUND OF THE INVENTION

1. Field of the Invention

The invention relates to the field of television and, more particularly, an object of the invention is a device for assistance in the optical focusing of a television camera and a camera provided with such a device.

The optical focusing of a television camera is done by adjusting the focus of the objective lens mounted on the camera.

This adjustment can be done by the cameraman who focuses his camera by controlling the fineness of his image on a small television monitor or viewfinder, fixed on the camera, and who also centers the image as instructed by the director.

The task of focusing the image is therefore entrusted to the cameraman, and the only check is the one done through the image in the viewfinder.

The precision of the focusing therefore depends on the fineness and size of the viewfinder and practically rules out the use of a color viewfinder with a resolution smaller than that of black and white viewfinders.

In high-definition television, the definition of the image is doubled, vertically and horizontally, in relation to a standard image. The precision required of the cameraman for the focusing of the image should therefore be four times greater.

The limited size of the viewfinders that can be set up on a camera means that it is not always possible to obtain this increased precision. It is therefore frequently the case that high-definition images are not focused to the optimum degree. This is detrimental to promoting the use of this standard.

2. Description of the Related Prior Art

In certain high-definition cameras, manufacturers have introduced a focusing remote control unit on the desk of the vision controller who has a control monitor with higher resolution than that of the viewfinder. However, the vision controller does not have the cameraman's artistic sense, and does not necessarily know how or where to aim the camera.

Moreover, this system cannot be used in the very frequent case were several cameras are used. One vision engineer cannot control the focusing on several cameras at the same time.

SUMMARY OF THE INVENTION

An object of the invention is a device for assistance in the optical focusing of a television camera, enabling this problem to be resolved by providing additional help to the cameraman in the focusing of his image, through an independent technical criterion and easily exploitable means for the translation of this criterion in the viewfinder.

According to the invention, there is proposed a device for assistance in the optical focusing of a television camera comprising an objective lens with focusing that can be adjusted by a focusing knob, electronic processing circuits to obtain a video signal, and a viewfinder to check the image, during shooting, on the basis of the video signal, said device comprising:

- means for the picking up, from the electronic processing circuits of the camera, of a signal that varies with the focusing error of the objective,
- a marker generator, coupled with the pick-up means to generate a video signal from the signal that varies with the focusing fault, the video signal characterizing the image of a marker, the position of which in the image varies along an axis as a function of the fault;
- and a combination circuit, the inputs of which are connected to the video signal output, on the one hand, and to the output of the marker generator, on the other hand, and the output of which is connected to the signal input of the viewfinder, to inscribe the marker within the control image.

Another object of the invention is a television camera provided with an assistance device such as this.

BRIEF DESCRIPTION OF THE DRAWING

The invention will be understood more clearly, and the characteristics shall appear from the following description made with reference to the single appended figure that represents a block diagram of the device for assistance in focusing according to the invention.

DESCRIPTION OF THE PREFERRED EMBODIMENT

The invention uses the fact that when an image is sharp, the electronic transitions of the video picture are the shortest possible. The first and second derivatives of this picture are therefore the largest possible. The second derivative of the video picture is actually the rough contour signal and this contour signal can be picked up in the electronic video circuits. The optical focusing assistance device will give the cameraman a simple means of appreciating the amplitude of this contour signal, by translating it into an associated position of a reference point. To this end, the assistance device causes the appearance of a marker visible in the image seen by the cameraman. The servo-controlled position of this marker depends on the amplitude of the contour signal. This marker therefore gives a visual indication of the focusing on the basis of an independent technical criterion.

As a rule, the cameraman can choose the zone of the image in which he seeks to do the focusing. To this end, a window is also displayed, the position of which is fixed in the image by means of a shifting control positioned on the focusing knob.

Hence, once the focusing zone has been selected and delimited by the window, the cameraman activates the focusing control so as to position the marker in the position associated with the best focusing.

The single figure is a block diagram of the device for assistance in the focusing of a television camera. It has a circuit 10 for the extraction, from the contours signal $S_c$, of a video signal Svideo and a camera focusing piece 20 provided with a knob 22 for the focusing control and a TRIM control unit 21 for shifting a window in the image. This TRIM control unit is shaped like a pyramid and can be shifted by the thumb in four directions: up, down, right and left.

A window generator 30 translates the shifts activated by the "TRIM" control unit into the form of a window signal SF applied to the control input of a circuit 40 for windowing the contour signal $S_c$ applied to its input signal. The window generator 30 also controls a circuit 50 for the extraction of the edges of the window in order to insert a depiction of this window into the image formed in the viewfinder. The contour signal windowing circuit 40 gives the contour signal in the selected window $S_{CF}$, and this signal is applied to a marker generating circuit 60. This Circuit expresses the mean amplitude of the contour signal in the window by a marker. The marker is, for example, a small black or white square, the position of which, on a horizontal axis at the bottom of the image, is servo-linked to the mean amplitude of the contour signal in the window $S_{CF}$.

A mixing circuit 70 then prepares the video signal applied to the viewfinder by overlaying, on the input video signal Svideo, the characteristic signal $S_M$ of the marker and the characteristic signal $S_{BF}$ of the edges of the window. The image seen by the cameraman in the viewfinder 80 results from the superimposition of these three signals.

The different processing operations done with the video signal and the details of the corresponding circuits are within the scope of those skilled in the art, and shall therefore not be described in the present description.

The invention is not limited to the embodiment described here above. In particular, a focusing zone has been defined by a window and it is provided that this window will be positioned in the image that appears in the viewfinder. However, it is also possible to consider the entire image for the focusing operation and to establish the technical criterion for the focusing from the contour signal of the entire image. In this case, it is clearly not necessary to use a window generator or to extract the edges of the window to display them in the viewfinder.

Furthermore, in the embodiment described, the axis on which the marker is shifted is a horizontal axis at the bottom of the image. It is quite possible for this axis to be located at the top of the image or for this axis to be a horizontal axis, to the right or left of the image. The marker may also have a different shape (for example the shape of a line) and the axis may be depicted by a line, the axis and the marker line being orthogonal.

The device for assistance in optical focusing according to the invention gives the user a number of advantages:

the cameraman retains his function of centering and focusing the camera;

the focusing no longer depends on the size of the viewfinder;

this approach permits the use of a color viewfinder with lower resolution than that of black and white viewfinders;

the remote control of the focusing, done from a control desk at a distance from the camera, is no longer needed;

this approach can be applied to all television cameras, especially to high-definition television cameras where it is very useful, as well as to presently used standard cameras;

this approach enables an automation of the focusing while, at the same time, leaving the choice of the focusing window to the cameraman.

What is claimed is:

1. A device for assistance in the optical focusing of a television camera, comprising an objective lens in which focusing can be adjusted by a focusing knob, electronic processing circuits to obtain a video signal, and a viewfinder to check an output image, during shooting, on the basis of the video signal, said device comprising:

means for extracting from the video signal of the electronic processing circuits of the camera, a contour signal corresponding to a second derivative of the video picture and having an amplitude that varies with the focusing error of the objective lens, a marker generator, coupled with the extracting means to generate a marker video signal, from the contour signal that varies with the focusing error, said marker video signal characterizing an image of a marker, the position of which in the output image varies along an axis as a function of an amplitude of the contour signal;

and a mixing circuit, the inputs of which are connected to the video signal output, on the one hand, and to the output of the marker generator, on the other hand, and the output of which is connected to the signal input of the viewfinder, to inscribe the marker in the output image the optical focusing being controlled by adjusting the focusing knob so that the marker video signal indicates a minimum focusing error.

2. A device according to one of the claim 1 wherein, with the focusing being done from a zone of the image marked out by means of a trim control unit, the commands of which are translated by a window generator into a window signal, the window generator controls a circuit for the windowing of the signal varying with the focusing error of the objective lens to limit this signal to its components associated with the window before applying it to the marker generator.

3. A device according to claim 2, wherein the trim control unit is a pyramidal control unit positioned on a piece also bearing the focusing knob.

4. A television camera having a device for assistance in the optical focusing of the television, comprising an objective lens in which focusing can be adjusted by a focusing knob, electronic processing circuits to obtain a video signal, and a viewfinder to check an output image, during shooting, on the basis of the video signal, said device comprising:

means for extracting, from the electronic processing circuits of the camera, a contour signal corresponding to a second derivative of the video picture and having an amplitude that varies with the focusing error of the objective lens, a marker generator, coupled with the extracting means to generate a marker video signal, from the contour signal that varies with the focusing error, said marker video signal characterizing the image of the marker, the position of which in the output image varies along an axis as a function of an amplitude of the contour signal;

and a mixing circuit, the inputs of which are connected to the video signal output, on the one hand, and to the output of the marker generator, on the other hand, and the output of which is connected to the signal input of the viewfinder, to inscribe the marker in the output image the optical focusing being controlled by adjusting the focusing knob so that the marker video signal indicates a minimum focusing error.

5. A device according to claim 4 wherein, with the focusing being done from a zone of the image marked out by means of a trim control unit, the commands of which are translated by a window generator into a window signal, the window generator controls a circuit for the windowing of the signal varying with the focusing error of the objective lens to limit this signal to its components associated with the window before applying it to the marker generator.

6. A device according to claim 5, wherein the trim control unit is a pyramidal control unit positioned on a piece also bearing the focusing knob.

* * * * *